Nov. 22, 1966  J. BRUSSELL  3,287,140
SELF-HEATING FROZEN FOOD PACKAGE
Filed April 11, 1966  2 Sheets-Sheet 2

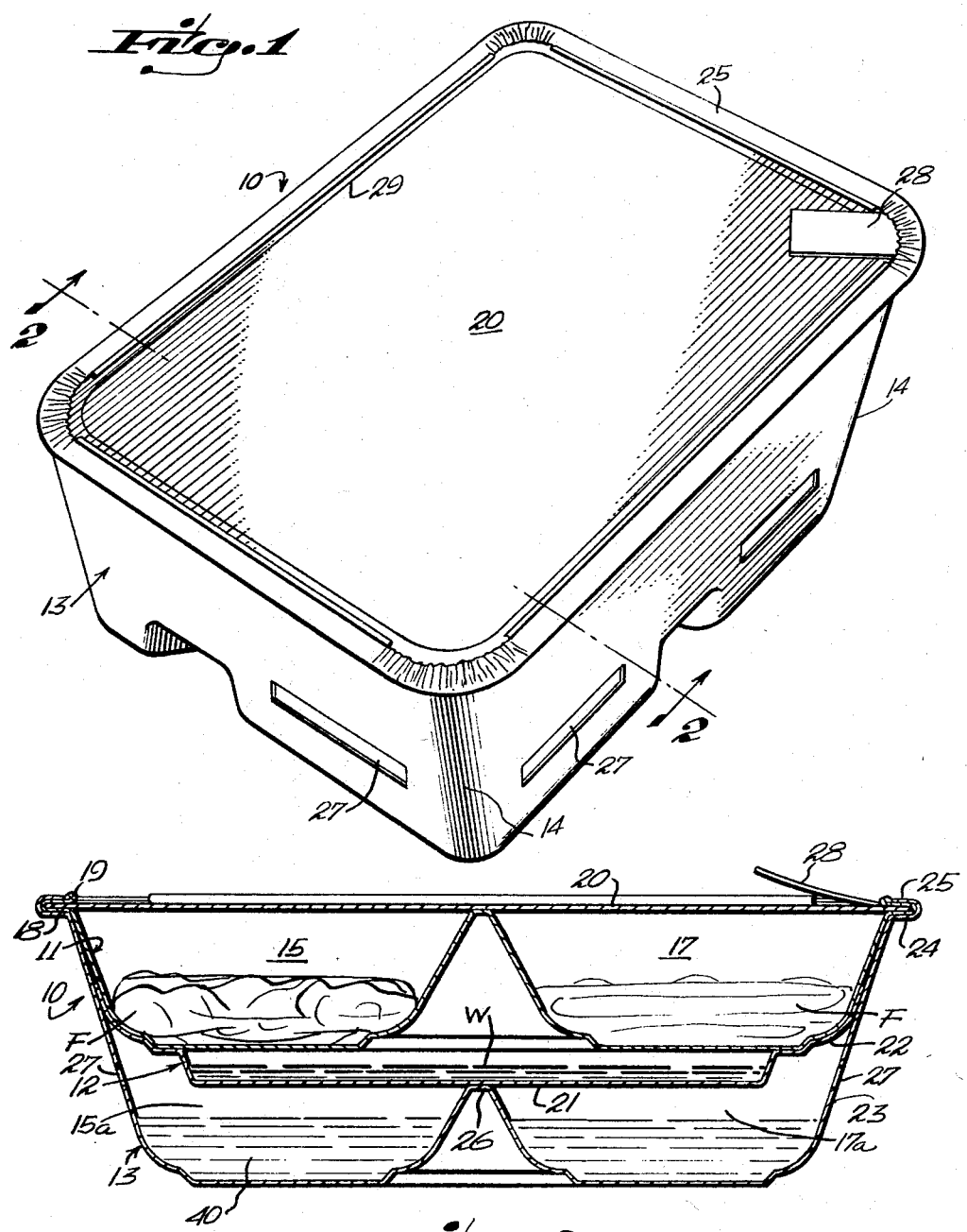

INVENTOR.
JACOB BRUSSELL
BY E. H. Schmidt, Atty.

United States Patent Office 3,287,140
Patented Nov. 22, 1966

3,287,140
SELF-HEATING FROZEN FOOD PACKAGE
Jacob Brussell, 41 E. 8th St., Hialeah, Fla.
Filed Apr. 11, 1966, Ser. No. 549,090
5 Claims. (Cl. 99—192)

My invention relates to frozen foods and is directed particularly to improvements in self-contained heating means in a frozen food tray package.

The principal object of my invention is to provide a self-heating frozen dinner of the character described wherein the heating of the frozen food tray is effected by a combination of steam and dry heat so applied as to preserve the natural flavor, texture, moisture content and nutritional value of the food as originally prepared, i.e., to recondition the frozen food to its natural state.

A more particular object is to provide a method and means for heating frozen, pre-cooked foods which comprises a tier of three trays or pans secured together as a unit, the upper tray of which contains the frozen food, the intermediate tray of which contains a predetermined amount of water in the form of ice, and the lower tray of which contains a predetermined amount of fuel, the amounts of water and fuel being such that when the fuel is ignited, it will furnish enough heat to unfreeze the water and turn it into steam of sufficient quantity to completely unfreeze the food, but not heat it substantially before boiling completely away, after which enough dry heat is still given off by the fuel to further heat the unfrozen food sufficiently and with just enough drying action to recondition the food to its natural flavor, moisture, and texture.

Another object is to provide a method and means for heating frozen foods of the character above described wherein the food tray comprises a plurality of compartments, each containing a different food, which together may constitute a dinner for example, and wherein the fuel comprises predetermined individual fuel portions for each food compartment so measured as to provide the proper individual quantities of heat needed, thereby avoiding underheating of one or more of the food portions.

Still another object is to provide a self-contained baking method and means for prepared, but unbaked, frozen packaged foods.

Another object is to provide a self-heating frozen dinner package of the above nature which will be inexpensive to manufacture, and clean, fast and simple in operation.

Other objects, features and advantages of invention will be apparent from the following description when read with reference to the accompanying drawings. In the drawings, wherein like reference numerals denote corresponding parts throughout the several views:

FIG. 1 is a perspective view of the self-heating frozen dinner package embodying the invention;

FIG. 2 is a vertical cross-sectional view taken along the line 2—2 of FIG. 1 in the direction of the arrows;

Referring now in detail to the drawings, 10 in FIG. 1 designates, by way of example, a self-heating frozen dinner tray package embodying the invention, the same comprising, generally, an upper food tray 11, an intermediate water pan 12 and a bottom fuel tray 13, all secured together in vertical arrangement, and all preferably stamped of light-gauge sheet metal, preferably aluminum.

Figure 3:
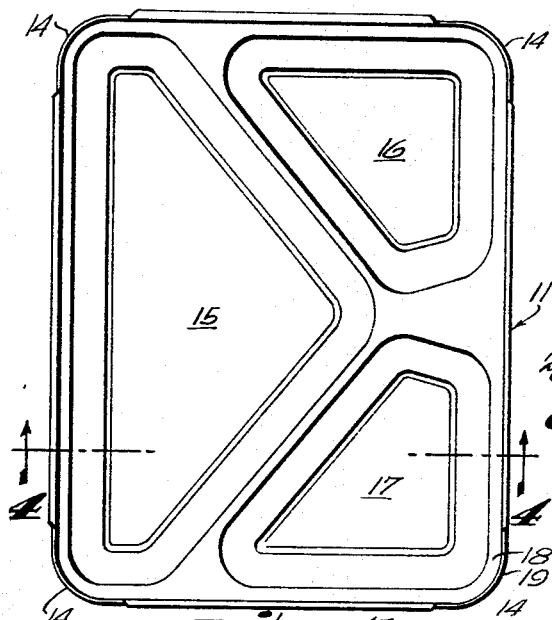
FIG. 3 is a top view of the food tray, shown separately.
Figure 4:
FIG. 4 is a vertical cross-sectional view taken along the line 4—4 of FIG. 3 in the direction of the arrows.

The food tray 11, shown separately in FIGS. 3 and 4, is rectangular in shape with rounded corners 14, and formed with food holding recesses 15, 16 and 17, adapted to contain various portions of frozen cooked foods which may, for example, constitute a basic dinner. The food tray 11 is further formed with a short, outwardly-extending peripheral flange 18 terminating in a short upstanding peripheral lip 19 adapted to be bent downwardly and inwardly to hold a flat cover 20 in place over food portions F in the recesses 15, 16 and 17.

Figure 5:
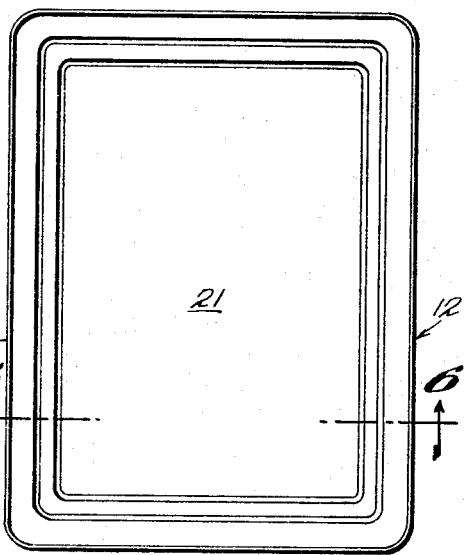
FIG. 5 is a top view of the water tray, shown separately.
Figure 6:
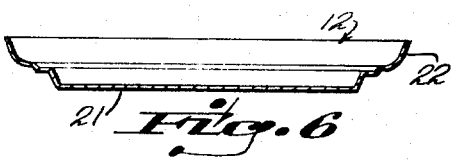
FIG. 6 is a vertical cross-sectional view taken along the line 6—6 of FIG. 5 in the direction of the arrows.

As illustrated in FIGS. 5 and 6, the water pan 12 is comparatively shallow, having a flat bottom wall 21 and an upstanding peripheral side wall 22 conforming to the outside wall shape of substantially the lower half of the food tray 11. The water pan 12 is preferably press-fitted against the food tray 11 and remains attached by frictional engagement. A predetermined quantity of water W in the form of ice is provided in the water pan 12, as illustrated in FIG. 2.

Figure 7:
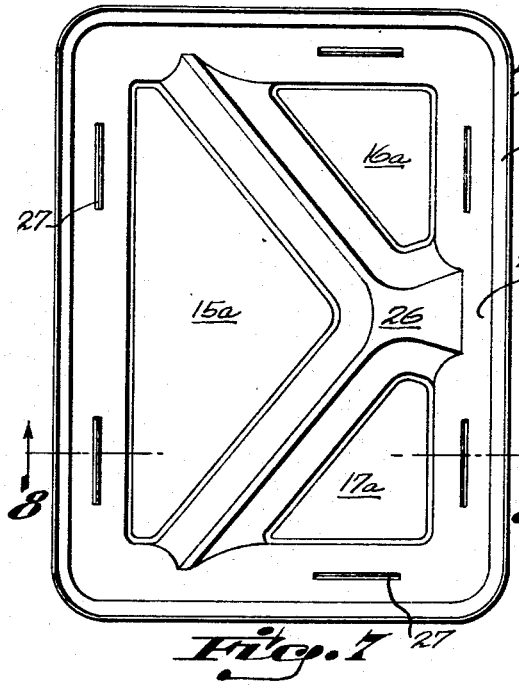
FIG. 7 is a top view of the fuel tray, shown separately.
Figure 8:
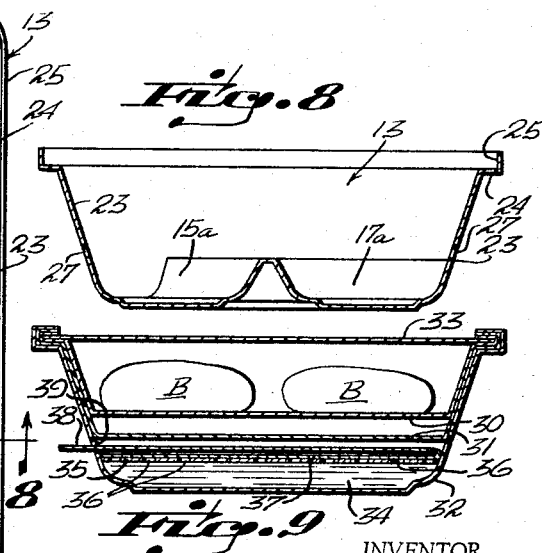
FIG. 8 is a vertical cross-sectional view taken along the line 8—8 of FIG. 7 in the direction of the arrows.

As illustrated in FIGS. 7 and 8, the fuel tray 13 is recessed as at 15a 16a and 17a to conform substantially to the recesses 15, 16 and 17, respectively, in the food tray 11. The peripheral wall 23 of the fuel tray 13 is comparatively tall, and at its upper end conforms to the outside wall shape of substantially the upper half of the food tray 11, having an outwardly-extending peripheral flange 24 terminating in a peripheral lip 25 adapted to be bent downwardly with the lip 19 of said food tray to hold the entire assembly together as a unit, as shown in FIGS. 1 and 2. As illustrated in FIG. 2, the upper end of the interior dividing wall portion 26 of the fuel tray 13 seats tight up against the flat bottom wall 21 of the water pan 12, whereby the fuel recesses 15a, 16a and 17a are divided to provide completely separate compartments. Predetermined amounts of fuel 40 are provided in each of the fuel recesses 15a, 16a and 17a, the amount being determined upon the type and quantity of food to be heated in the corresponding compartment 15, 16 and 17, respectively, in the food tray 11, as hereinbelow more fully described. The fuel may be any kind of domestic fuel, either solid (when frozen) or gaseous. By way of example, alcohol compounded with gelation could be used. Rectangular openings 27 are provided in the side wall of the fuel tray 13 to admit air and to permit insertion of a match for ignition.

In use, it is only necessary to ignite the fuel F in the fuel compartments 15a, 16a and 17a, whereupon the heat given off will first melt and bring to a boil the water W in the water tray 12. Sufficient water is provided to unfreeze the food in the various food compartments of the food tray 11, and bring it up to moderate warmth, say 80 or 90 degrees Fahrenheit, at which point the water will be fully evaporated. Steam given off by the water in boiling away will find its way to the outer atmosphere through the spacing between the outside wall of the food tray 11 and the inside walls of the water tray 12 and fuel tray 13, emerging between the lips 19, 25 at the top of the assembly. Sufficient fuel will still be left in each of the fuel compartments to finish just the required dry heat, through the water pan 12, to the food portions in the corresponding upper food recesses to individually heat them to the proper levated temperatures without overheating and consequent drying out. Thus, if french-fried potatoes in one food compartment should require more heat than peas in another compartment, corresponding amounts of fuel would be supplied in their respective fuel compartments. As a result, the various food portions are selectively heated to their particular requirements for preserving natural taste, nutritional value, moisture content and texture. After the last remaining portion of fuel has burned away, the cover 20 can easily be removed by pulling on the cover tab 28, exposing the heated food ready for eating.

Figure 9:
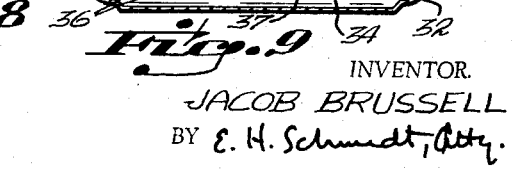
FIG. 9 is a vertical cross-sectional view of a modification of the invention adapted for baking.

FIG. 9 illustrates, in cross-sectional view, a modification of the invention adapted for baking prepared by uncooked bake products. The bake package comprises a food tray 30, which may contain buns B to be baked for example, an intermediate tray 31, a bottom fuel tray 32 and a cover 33, all of substantially the same shape and arrangement as the tray package of FIGS. 1 and 2, except for there being only one compartment in the food and fuel trays. The fuel in the fuel tray 32 may be, by way of example, natural gas, as indicated at 34, contained by a cover 35 secured to said fuel tray. The cover 35 is provided with a plurality of flame openings 36 covered by a tear strip 37 having a tab 38 extending through one of the side wall openings 39. In use, it is only necessary to pull away the tear strip 37 by means of the tab 38, after which the escaping gas can be ignited to start the baking process. It is to be noted that there is no water in the intermediate tray 31, so that baking of the food B in the food tray 30 is accomplished by the hot air in said intermediate tray heated by the fuel from underneath. Just enough fuel is provided in the fuel tray 32 to properly bake the food contained in the food tray. Here again, baking is accomplished in a few minutes and when ready can be removed for eating by simply tearing away the top cover 33.

While I have illustrated and described herein only two ways in which my invention can conveniently be embodied in practice, it is to be understood that these embodiments are presented by way of example only, and not in a limiting sense. The invention, in brief, comprises all the modifications and embodiments coming within the scope and spirit of the following claims.

What I claim as new and desire to obtain by Letters Patent is:

1. In a self-heating frozen food package, the combination comprising an upper metallic food tray with frozen food therein, an intermediate metallic pan and a lower metallic fuel tray all secured together in vertically spaced arrangement to provide a unitary structure having an upper food compartment, an intermediate compartment and a lower fuel compartment, a removable cover on said food tray, an amount of fuel in said fuel tray of such quantity as to furnish, when ignited, just sufficient heat through said intermediate compartment to prepare a given quantity and kind of frozen food in said food compartment for eating, and a plurality of openings in said fuel tray providing access to ignite said fuel and admitting air for its combustion.

2. A self-heating frozen food package as defined in claim 1 including a quantity of water in the form of ice in the intermediate compartment, the quantity of fuel being such that when ignited it will furnish enough heat to unfreeze said water and turn it into steam of sufficient quantity to completely unfreeze the food, but not heat it substantially before boiling completely away, after which enough dry heat will be given off through the intermediate compartment to further heat the unfrozen food sufficiently hot and with just enough drying action to recondition the food to its natural heated state, ready for eating.

3. A self-heating frozen food package as defined in claim 2, wherein each of said food and fuel trays is partitioned to provide a plurality of compartments, each of said food compartments holding a different kind of prepared frozen food, each of said fuel compartments having a quantity of fuel determined by the particular food in its corresponding food compartment.

4. The invention as defined in claim 2, wherein said food tray, said pan and said fuel tray are formed of light-gauge metal and wherein said fuel tray is provided with side openings admitting air for combustion to said fuel compartment.

5. The invention as defined in claim 1, wherein said fuel is in the form of a solid.

References Cited by the Examiner

UNITED STATES PATENTS

| | | | |
|---|---|---|---|
| 725,335 | 4/1903 | Glaessner | 126—43 |
| 1,325,515 | 12/1919 | Hartman | 126—43 |
| 1,820,325 | 8/1931 | Raye | 126—369.1 |
| 2,022,152 | 11/1935 | Roedl | 126—369.1 |
| 2,101,180 | 12/1937 | Jacobs | 126—261 |
| 2,756,738 | 7/1956 | Kratz | 126—43 X |
| 2,850,391 | 9/1958 | Gunsberg | 99—192 |

FOREIGN PATENTS

| | | |
|---|---|---|
| 14,894 | 1909 | Great Britain. |

A. LOUIS MONACELL, *Primary Examiner.*

R. N. JONES, *Assistant Examiner.*